United States Patent [19]

Atkins et al.

[11] 3,917,867

[45] Nov. 4, 1975

[54] PROCESS FOR PRODUCING A NATURAL ORANGE BASE BY DILUTION AND CENTRIFUGING

[75] Inventors: Cedric D. Atkins; John A. Attaway, both of Winter Haven; Matthew D. Maraulja, Lakeland, all of Fla.

[73] Assignee: State of Florida Department of Citrus, Lakeland, Fla.

[22] Filed: Nov. 16, 1973

[21] Appl. No.: 416,557

Related U.S. Application Data

[60] Division of Ser. No. 323,216, Jan. 9, 1973, abandoned, which is a continuation-in-part of Ser. No. 867,886, Oct. 20, 1969.

[52] U.S. Cl. ............... 426/492; 426/490; 426/521; 426/599
[51] Int. Cl.[2] ......................................... A23P 1/00
[58] Field of Search ............ 426/50, 495, 190, 506, 426/492, 490, 478, 203, 365, 425, 431

[56] References Cited
UNITED STATES PATENTS

| | | | |
|---|---|---|---|
| 2,115,815 | 5/1938 | Johnson | 426/492 |
| 3,150,981 | 9/1964 | Redd | 426/431 |
| 3,169,873 | 2/1965 | Clark | 426/431 |
| 3,300,320 | 1/1967 | Distelkamp | 426/490 |
| 3,301,685 | 1/1967 | Harwell | 426/495 |
| 3,346,392 | 10/1967 | Lowe | 426/495 |
| 3,391,009 | 7/1968 | Fehlberg | 426/431 |

*Primary Examiner*—Norman Yudkoff
*Assistant Examiner*—Hiram H. Bernstein
*Attorney, Agent, or Firm*—James J. Brown, Esq.

[57] ABSTRACT

A highly colored, smooth, low viscosity orange base having the natural color, cloud and body of the fruit juice is obtained by treating the natural orange juice so as to deactivate a substantial portion of pectins present in the juice or alternatively, by reducing the Brix level of the juice and then centrifuging, thereby permitting separation of fats and other excess insoluble materials without affecting the natural color, body and cloud of the juice. Selective inactivation of the pectins present in the orange juice is effected by employing specific enzymes.

5 Claims, No Drawings

PROCESS FOR PRODUCING A NATURAL ORANGE BASE BY DILUTION AND CENTRIFUGING

This is a division of application Ser. No. 323,216, filed Jan. 9, 1973, now abandoned which is a Continuation-in-Part of application Ser. No. 867,886, filed Oct. 20, 1969.

This invention relates to a highly colored, smooth, low viscosity orange base having the natural color, cloud and body of the fruit juice from which it is obtained and yet being free of suspended solids.

Orange juice contains the natural-occurring colloid stabilizer known as pectin which gives the juice a viscosity or consistency termed "body" along with suspended fatty materials and phospholipids which are partly responsible for the cloud present in citrus juices. Previous attempts to remove insoluble pulp solids from citrus juices have resulted in also detrimentally affecting the body and cloud of the citrus juice. For example, in the past, when the pectin colloid has been altered by the activity of the pectic enzyme pectinesterase, the juice has clarified and become watery. U.S. Pat. No. 2,970,948, to Stevens, discloses such a procedure whereby insoluble solids present in fruit juice are removed by the addition of pectinesterase to obtain a "brilliantly clear serum". However, the serum obtained by the invention of this patent is subsequently dried to give a nutrient media for the cultivation of bacteria and is not a satisfactory juice for consumption due to its lack of cloud and body.

In accordance with the present invention, it has been found that a highly colored, smooth, low viscosity orange base, which can be concentrated into a 100 percent orange juice syrup suitable for production of bottled or canned beverages and meeting all the requirements of bottled syrup and, in addition, having satisfactory cloud and body while being free of suspended solids can be obtained from fresh or reconstituted orange juice by removing a substantial portion of pectic substance present in the orange juice specifically without affecting or removing phospholipids present in the orange juice and separating insoluble fatty materials from the juice.

Surprisingly, in one embodiment of the present invention, it has been found that by employing certain specific enzymes which are specific for pectic substances, it is possible to effect the hydrolysis of pectic substances in orange juice and thereby permit the removal of fatty solids without also removing phospholipids which are responsible for the desirable optical properties (i.e., cloud) and body in natural orange juice and which are retained in the product of the present invention.

According to this aspect of the present invention, freshly extracted orange juice or reconstituted bulk orange juice concentrate is first heated to a temperature of about 155° to 210°F., preferably about 165°F., in order to inactivate the naturally present pectic enzymes in the orange juice such as pectinesterase. Subsequent to this heating, the juice is cooled to a temperature of about 70° to 120°F., preferably about 80°F., and sufficient pectic enzyme added to hydrolyze a substantial portion of the pectins present in the juice. The pectic enzyme employed (which may contain traces of adulterating non-specific enzymes) should, however, not be permitted to remain in contact with the citrus juice substrate for sufficient time to affect the substances responsible for maintaining the cloud, color and body of the juice or cause the serum viscosity to drop below about 1.40 to 1.5 centipoise or the increase of light transmission to be more than about 20 percent (preferably 10 percent) over the original value for the juice.

The amount of enzyme actually employed will depend on a number of factors such as time of treatment until the enzyme is deactivated, enzyme concentration and temperature. Generally, these parameters can be varied as convenient by one skilled in the art to effect a reduction of the pectic fractions based on the reconstituted single-strength juice to about 0.03 to 0.05 weight percent pectins and about 0.002 to 0.015 weight percent water-insoluble solids. Typically, for example, about 0.05 to 0.20 volume percent based on the volume of single-strength juice of enzyme is sufficient when the juice containing the enzyme is allowed to stand for about 2 to 7 hours at about 70°–120°F. before raising the temperature to deactivate the enzyme.

Following addition of the pectic enzyme to the juice, the juice is allowed to stand at a temperature of about 70° to 120°F., preferably about 80°F., in order to destroy substantially all the low pectins present in the juice which lack gelling strength and are the result of maceration of the more solid fruit parts. Generally, it is not necessary to remove substantial amounts of high-grade pectins such as protopectin which are present in insoluble solids. The juice is then heated to a temperature of about 155° to 210°F., preferably about 200°F., inactivate the enzymes present and also destroy any microorganisms. Insoluble solids are then removed, for example, by decanting, and the remaining juice treated by centrifuging or filtering, for example, to yield a colored, single-strength juice similar to that present in the cell sac of the fruit prior to normal juice extraction, but absent the insoluble solids and low-grade insoluble pectins which are held in suspension. The juice, however, which has an apparent viscosity of about 225 centipoises or less at 65° Brix and 77°F., retains the desirable cloud and body naturally present in fresh juice and in addition, has good shelf life due to the removal of oxidizable fatty materials.

While not intending to be bound by theory or mechanism of the reaction, it is believed that the mixture of enzymes acts to cause the cleavage of methoxyl groups from the colloidal pectic chain. The naturally occurring calcium in the juice combines with the methoxyl groups to form insoluble calcium pectinates which are in the form of gel particles and are readily removed together with calcium pectinates already present in the juice, by decanting and centrifuging. During this chemical reaction some water-soluble pectin is extracted which tends to raise the final water-soluble pectin content slightly in the finished base. The enzymic depulping of the juice drastically reduces the viscosity of the finished orange bases and care must be taken to terminate the enzyme activity at the proper time. This can be accomplished by sampling the reacting juice periodically and determining serum viscosity and percent light transmission values. When the serum viscosity has dropped to between 1.40 and 1.50 centipoises, the juice is immediately pumped to a heat exchanger-pasteurizer and heated to about 200°F. to inactivate the enzyme. Light transmission value increases often range from about 3 to 7 percent indicating a slight loss in cloud and should increase in the final product no more than 20 and preferably 10 percent above the original value. The serum viscosity values of the finished base should range between 1.40 and 1.50 centipoises.

Suitable pectic enzymes for use in the present invention can be prepared from sprouted oats, for example, or obtained commercially, for example, under the trade name "Spark-L". Selection of the most desirable enzyme for removal of excess insoluble solids present in extracted juices depends on the specificity of the chosen enzyme to hydrolyze pectin to insoluble pectates without the removal of juice color and cloud naturally present in citrus juices at the pH of the juice.

Concentrates of the natural pectinesterase enzyme can be prepared, for example, where processing of citrus fruits is in progress. Insoluble solids from juice extraction procedures in the form of pulp, juice sacs, and rag are washed with distilled water to remove sugars and acids present in the mixture. The citrus pulp solids are rapidly screened and pressed to remove excess water. The dewatered residue is then comminuted to pass a 100 Tyler mesh sieve. The slurry is tested to determine the potency of the native pectinesterase extract at the pH of about 7.0 to 7.5. The insoluble solids slurry containing the pectinesterase is added to 80° Brix clarified citrus concentrate at a natural pH of 2.3 to 4.5. This addition should not lower the natural sugar concentration to below 65 percent concentration. The enzyme contained in the 65 percent natural sugar concentrate is then subjected to temperature below 0°F. Dehydration of the yeast and fungi bodies effectively destroys the ability of these microorganisms to produce additional enzymes destructive to the color and cloud of citrus juices. When this citrus enzyme mixture is used for clarification, the pulp or insoluble solids content of the juice to be clarified should not be in excess of 12 percent insoluble solids content.

The polygalacturonase activity of a pectinol preparation, representing an alcohol precipitate from an extract of mold cultures was compared to the activity of the pectinesterase prepared from citrus residues of pulp, juice sacs and rag. The crude enzyme preparation of pectinesterase, without the presence of NaCl (salt normally used in pectinesterase extraction) retained sufficient activity for successful clarification, and gave more evidence that there are at least two enzymes, pectinesterase and pectinase, capable of demethylating pectin, one occurring in higher plants (citrus) and the other in commercial pectinase preparations made from mold cultures. These commercially prepared enzyme solutions performed, when tested on citrus juices, in a similar manner to the pectinesterase enzyme concentrated from citrus pulp or insoluble solids normally present in extracted unheated citrus juices.

Pectinesterase and polygalacturonase or mixtures of the two were used to clarify citrus juices. The pectinesterase enzyme catalyzes the cleavage of methoxyl groups from the pectic chain. These groups in the presence of calcium form calcium pectinate gel particles that lack solubility in water or citrus juices and are readily removed by centrifugation of the citrus juice substrate. Polygalacturonase rapidly breaks the main pectin chain to form insoluble pectinates that can be centrifuged or filtered from the juice substrate.

In a further embodiment of the present invention, it has been found that a highly colored, low viscosity orange base having satisfactory cloud and body while being free of suspended solids can also be obtained from fresh or reconstituted orange juice by a unique procedure involving dilution and centrifuging of the juice. This method can be used in place of the aforementioned enzymatic depulping procedure which requires large juice tanks to be tied up for long periods of time and which is generally more suitable for the preparation of the orange base in small batches.

According to this procedure, the fresh single-strength juice or reconstituted orange concentrate is further diluted with water to between 6 and 7° Brix. The diluted juice is pumped directly to a high-speed desludge centrifuge such as the Westfalia De-Sludger/Clarifier, Model SA-7, for small plants or Model SAMM-20006 for large operations. The addition of water and consequent reduction of dissolved solids in the juice to 6° or 7° Brix also reduces the serum viscosity of the juice to approximately one-half the normal value. Orange juices having between 2.0 and 2.5 centipoises of viscosity are reduced by water dilution to between 1.1 and 1.3 centipoises. At this dilution, only about one-half of the normal water-soluble pectin is present to hold unwanted insoluble pectinates and small pulp particles in suspension. These insoluble materials called pulp are released from suspension and can then be easily removed by the Westfalia De-Sludger/Clarifier down to a level of 0.3 to 0.6 percent by volume without destroying water-soluble pectins or removing the highly colored and cloud-giving phospholipids.

Typically, the desludge centrifuge is operated at between 26 and 30 percent of its maximum capacity, or for the Model SA-7, between 90 and 100 gallons per hour of juice feed into the centrifuge and for the Model SAMM-20006, between 1000 and 1200 gallons per hour of juice feed into the centrifuge. This juice feed range will accommodate juices having bottom pulp content of from about 12 to 18 percent by volume. In cases of reconstituted concentrates having bottom pulp levels as low as 6 to 10 percent by volume, the juice feed may be increased to about 40 percent of the rated capacity and still maintain the necessary residual insoluble solids level of 0.3 to 0.6 percent by volume; further adjustments to the centrifuge to maintain proper pulp removal include setting the desludge cycle timer for 4 to 5 minute desludge cycle, the desludge bowl open time at 1.0 to 1.3 seconds, and adjusting operating water pressure to cause the bowl to open properly to desludge itself.

Samples of de-pulped orange juice may be quickly taken from the centrifuge sample valve at any time for determining juice color, cloud, and pulp as a check on proper centrifuge operation. The removal of insolubles to the point where the color score drops more than one score point below the original color score, indicates the removal of some of the highly colored phospholipids and excessive cloud loss will occur, resulting in a poorly colored and partly clarified orange base. The centrifuge underflow or pulp discharge, using the centrifuge settings described, will contain sufficient juice to be in the form of a thick slurry, indicating that the juice passing through the centrifuge is being thoroughly de-pulped.

The additional water contained in the juice prior to centrifuge de-pulping is removed by concentration and serves only temporarily to release insolubles so that they may be removed during the centrifuge operation. Unless the serum viscosity of the juice is reduced by proper dilution, pulp removal will be difficult and slow, excessive juice will be removed and admixed with the pulp resulting in an uneconomical operation, and the resulting bottom pulp content will rarely be lower than 1.5 percent by volume.

Again, without being bound by any explanation of theory or mechanism, it is believed that the reduction in viscosity due to centrifuge desludging of the diluted juice is a result of the calcium pectinates and fine particles of pulp that are normally held in suspension, being thrown out by the high speed centrifugal action together with the calcium pectinates and pulp particles that normally settle out of orange juices. The reduction in viscosity by both methods is effected mainly by the removal of insoluble materials.

Orange bases prepared by centrifuge depulping have somewhat more body than those prepared by enzyme depulping and range in apparent viscosity from between about 500 to 700 centipoises of viscosity. Commercial orange concentrates of about 60° to 70° Brix range in apparent viscosity from about 3,000 to 12,000 centipoises. The high viscosities are due to insoluble materials, ammonium hydroxide and sodium hydroxide soluble pectic fractions in the juices.

Following depulping, the low Brix juice is heated as in the enzymatic treatment to about 155° – 210°F. to destroy any microorganisms present.

If desired, the juice prepared according to either procedure of the present invention can then be concentrated, for example, under vacuum, in order to preclude the use of high temperatures which result in a "burned" taste, to yield a sparkling colored syrup of any desired concentration (e.g., about 64°–80° Brix) for any juice product. It may also be desirable to refilter this base prior to bottling in order to remove traces of insoluble cloud materials that may have developed on storage of the base.

It is an additional advantage of the present invention that the orange base concentrate prepared by either process thereby can be employed to prepare a carbonated single-strength citrus juice. Preparation of such carbonated single-strength citrus juices has not in the past been successful due in part to the tendency of pulp particles in the bottled product to cause release of carbon dioxide upon opening and, more importantly, because these pulp particles have prevented proper carbonation of the product prior to filling and capping. According to the present invention, however, a carbonated bottled citrus juice of exceptionally good quality and having good cool storage stability and a pleasant tangy flavor can be prepared from the single-strength orange base of this invention having a concentration of about 11°–15° Brix. Advantageously, about 1–3 weight percent citric acid and trace amounts of cold pressed peel oil (about 0.01 – 0.1 volume percent) can be added for flavor. Conventional preservatives such as sodium benzoate can also be added. Subsequent to mixing of the above ingredients, the bottles of single-strength citrus juice are pre-chilled to freezing. Carbonated water can then, for example, be added to the chilled base in desired amounts.

The orange base of the present invention, either as a concentrate or at its original strength, prior to concentration, can also have incorporated therein effective amounts of isotonic salts, such as sodium and calcium chloride, as are described in application Ser. No. 815,506, filed Apr. 11, 1969, now abandoned, and the Continuation-in-Part thereof, application Ser. No. 24,820, now U.S. Pat. No. 3,657,424. The presence of these additional salts is to replace those lost from the body during strenuous physical exercise. The amount of such sodium salt added will be about 0.05 – 0.18 weight percent and about 0.007 – 0.04 weight percent calcium salt will be added. Potassium salt can also be added in amounts of up to 0.004 weight percent.

EXAMPLE I (1B AND 2B OF TABLE I)

Freshly extracted 11.2° Brix orange juice was heated to 165°F. and cooled to approximately 80°F. One-half pint of a suitable specific pectic enzyme (Spark-L) was added to each 100 gallons of single-strength juice. The juice was allowed to stand for 7 hours at 80°F. The treated juice was then heated to about 200°F. to completely inactivate the enzymes and destroy any microorganisms present. The excess insoluble solids of the juice were decanted and the remaining juice centrifuged to yield a colored single-strength juice that represented that present in the cell sac of the fruit prior to normal juice extraction.

Following this preparation, the juice was then concentrated under vacuum to yield a sparkling colored syrup of 67° Brix concentration.

EXAMPLE II (1A AND 2A OF TABLE I)

Freshly reconstituted single-strength orange juice concentrate having a Brix of about 11.2° was pumped directly to a holding tank where water was blended with the juice to adjust the juice solids to 7.0° Brix. The serum viscosity of the juice was thereby reduced from about 2.4 cp to 1.2 cp. It was then pumped at a rate of 120 to 125 gallons per hour to a Westfalia De-Sludger/Clarifier De-Sludger/Calarifier SA-7 centrifuge which was adjusted for a de-sludge cycle of 5 minutes and a bowl open time of one second to de-pulp the diluted juice from 8.5 percent down to 0.4 percent by volume with a cloud loss of only 2.5 percent light transmission and a loss of color of less than one point. The de-pulped juice was immediately heat-treated at 200°F. to inactivate any microorganisms. Following this preparation, the juice was then concentrated under vacuum to yield a sparkling colored syrup of 67° Brix concentration.

Analyses of several bases and control concentrates from which the bases were prepared by both methods of the present invention, as described in Examples I and II, are compared in Table I as follows:

TABLE 1

| | COMPARISON OF JUICES BEFORE AND AFTER TREATMENT—RECONSTITUTED TO 11.5°BRIX | | | | | | | |
|---|---|---|---|---|---|---|---|---|
| No.1 | Control conc. No.1A | Orange base No.1B | Orange base No.1C | Orange base No.2 | Control conc. No.2A | Orange base No.2B | Orange base No.2C | Orange base |
| Treatment | None | Normal centrifuge* | Normal enzyme** | Excess centrifuge*** | None | Normal centrifuge* | Normal enzyme** | Excess enzyme**** |
| Cloud — L.T. | 17.0 | 19.5 | 23.0 | 55.0 | 17.5 | 19.0 | 21.0 | 74.0 |
| Pulp — % by volume | 8.5 | 0.4 | 0.3 | 0.3 | 8.0 | 0.4 | 0.3 | 0.5 |
| Serum visc. centipoises | 1.94 | 1.86 | 1.41 | 1.90 | 2.03 | 2.00 | 1.42 | 1.39 |

Pectins—expressed as mg/100 g of 11.5° Brix juice

TABLE 1-continued

COMPARISON OF JUICES BEFORE AND AFTER TREATMENT—RECONSTITUTED TO 11.5°BRIX

| No.1 | Control conc. No.1A | Orange base No.1B | Orange base No.1C | Orange base No.2 | Control conc. No.2A | Orange base No.2B | Orange base No.2C | Orange base |
| --- | --- | --- | --- | --- | --- | --- | --- | --- |
| Treatment | None | Normal centrifuge* | Normal enzyme** | Excess centrifuge*** | None | Normal centrifuge* | Normal enzyme** | Excess enzyme**** |
| Water insol. solids | 128.2 | 2.4 | 12.0 | 4.5 | 133.4 | 2.4 | 6.8 | 4.8 |
| % by wt. | (.128%) | (.002%) | (.012%) | (.005%) | (.133%) | (.002%) | (.007%) | (.005%) |

Pectic fractions—mg/100 g

| | | | | | | | | | |
| --- | --- | --- | --- | --- | --- | --- | --- | --- | --- |
| Water soluble | 30.2 | 30.2 | 35.7 | 29.6 | 36.1 | 33.3 | 37.4 | 8.8 | |
| Amm. oxalate | 16.5 | 5.8 | 3.4 | 4.8 | 16.1 | 3.8 | 1.4 | 2.4 | |
| Sod. hydrox. | 30.9 | 4.1 | 1.9 | 2.8 | 28.2 | 0.7 | 1.9 | 2.4 | |
| Total | 77.6 | 40.1 | 41.0 | 37.2 | 80.4 | 37.8 | 37.8 | 40.7 | 13.6 |
| % by wt. | (.078%) | (.040%) | (.041%) | (.037%) | (.080%) | (.038%) | (.041%) | (.014%) | |

COMPARISON OF JUICES BEFORE AND AFTER TREATMENT—HIGH BRIX ORANGE CONCENTRATES AND LOW VISCOSITY BASES

| | | | | | | | | |
| --- | --- | --- | --- | --- | --- | --- | --- | --- |
| Conc. Brix | 70.1° | 67.21° | 67.63° | 67.01° | 57.75° | 64.48° | 64.93° | 65.2° |
| Apparent visc. centipoises | 11,500 | 650 | 203 | 620 | 3,100 | 510 | 104 | 68 |
| Color score | 38.7 | 37.7 | 38.7 | 36.1 | 38.1 | 37.6 | 37.4 | 37.0 |

Pectins—expressed as mg/100 g of high Brix juice

| | | | | | | | | |
| --- | --- | --- | --- | --- | --- | --- | --- | --- |
| Water insol. solids | 780.7 | 14.0 | 70.6 | 26.4 | 669.7 | 13.5 | 38.4 | 27.1 |
| % by wt. | (.781%) | (.014%) | (.071%) | (.026%) | (.670%) | (.014%) | (.038%) | (.027%) |

Pectic fractions—mg/100 g

| | | | | | | | | |
| --- | --- | --- | --- | --- | --- | --- | --- | --- |
| Water soluble | 183.8 | 176.4 | 209.9 | 172.5 | 181.2 | 186.8 | 211.3 | 49.7 |
| Amm. oxalate | 100.5 | 33.9 | 20.0 | 28.1 | 80.8 | 21.3 | 7.9 | 13.5 |
| Sod. hydrox. | 188.2 | 23.9 | 11.2 | 16.4 | 141.6 | 3.9 | 10.7 | 13.5 |
| Total | 472.5 | 234.2 | 241.1 | 217.0 | 403.6 | 212.0 | 229.9 | 76.7 |
| % by wt. | (.473%) | (.234%) | (.241%) | (.217%) | (.404%) | (.212%) | (.230%) | (.77%) |

*Prepared as described in Example II.
**Prepared as described in Example I.
***Prepared as described in Example II except that de-sludge cycle cut to 3 minutes.
****Prepared as described in Example I except that enzymatic treatment allowed to proceed for 15 hours.

TABLE II

| Sample | (1) | (2) | (3) | (4) | (5) |
| --- | --- | --- | --- | --- | --- |
| Amount of Added Enzyme | None | 0.055 Percent | 0.055 Percent | 0.055 Percent | 0.220 Percent |
| Orange Juice °Brix | 11.2° Brix Control | 11.2° Brix Good Cloud | 11.2° Brix Poor Cloud | 44.8° Brix Concen. | 44.8° Brix Concen. |
| Percent Light Trans. (Cloud) | 15 | 30 | 74 | 84 | 92 |
| Apparent Visc.-cps. | — | — | — | 91* | 88* |
| Serum Visc.-cps. | 2.03 | 1.50 | 1.42 | 1.42 | 1.39 |
| Pulp-Percent By Volume | 9.0 | 2.5 | 0.5 | 12.0 | 12.0 |
| Time of Enzymatic Activity | None | 2 hrs. at 80° | 25 hrs. at 80° | 25 hrs. at 80° | 25 hrs. at 80° |

(Pectins, Expressed as Mg/100 g of 11.2° Brix Juice

| | | | | | |
| --- | --- | --- | --- | --- | --- |
| H₂O Insol. | — | 46.6 (.0466%) | 4.8 (.0048%) | 192.7 (.193%) | 189.3 (.189%) |

(Pectic Fractions — Mg/100 g)

| | | | | | |
| --- | --- | --- | --- | --- | --- |
| H$_2$O Sol. | — | 26.9 (.0269%) | 8.8 (.0088%) | 24.8 (.0248%) | 15.9 (.0159%) |
| (NH$_4$)$_2$C$_2$O$_4$ Sol. | — | 4.8 (.0048%) | 2.4 (.0024%) | 16.8 (.0168%) | 15.0 (.015%) |
| NaOH Sol. | — | 8.7 (.0087%) | 2.4 (.0024%) | 15.5 (.0155%) | 14.1 (.014%) |
| Total | — | 40.4 | 13.6 | 57.1 | 45.0 |

*Apparent viscosity was determined by the Brookfield method on the concentrates only.

In all of the five samples shown in Table II, prior to the addition of the indicated pectolytic enzyme, naturally present enzymes were destroyed. The indicated amounts of pectolytic enzyme were added to samples 2–5 and enzymatic activity allowed to proceed at 80°F.; no enzyme was added to the 11.2° Brix juice of sample 1. At the end of 2 hours at 80°F. the temperature of sample 2 was raised to 200°F. to deactivate the enzyme and at the end of 25 hours at 80°F. the temperatures of samples 3–5 were raised to 200°F. to also terminate their enzymatic activity. Following heating to 200°F., samples 2 and 3 were desludged using a Westphalia De-Sludge centrifuge to remove insoluble material; samples 4 and 5, being finished concentrate products could not be desludged. Samples 4 and 5 were reconstituted to 11.2° Brix after which immediate separation took place. All samples were tested as 11.2° Brix juice. The indicated determination of 1) percent light transmission, 2) serum viscosity, 3) percent pulp, 4) pectic fractions were then made on the four samples.

As can be seen from the attached table, sample 3 which was determined to have a level of water-soluble pectins following centrifuging of 0.0088 percent, had a light transmission of 74 percent as determined on a Lumetron, Model 401 colorimeter, and exhibited a poor retention of cloud. Samples 4 and 5, which were reconstituted to 11.2° Brix from the enzyme-treated 44.8° Brix concentrates, were determined to have levels of water-soluble pectins of 0.0248 percent and 0.0159 percent, respectively; however, they underwent an almost total separation and clarification as shown by the extremely high percent light transmission and level of water insolubles. Sample 2, however, which was determined to have a level of water-soluble pectins of 0.0269 percent, gave a light transmission of 30 percent, indicating a good retention of cloud comparable to that of the untreated single-strength juice (sample 1). Sample 2, although retaining substantially the cloud of natural orange juice, exhibited a substantially reduced serum viscosity of 1.50 cps as compared with 2.03 cps for the untreated orange juice and decreased pulp level of 2.5 percent by volume.

Regardless of the method used in the preparation of the orange bases, it is always advantageous to use the juice of the Valencia orange or an orange juice blend containing a major portion of Valencia orange juice. Juice from the Valencia orange has inherently greater chemical stability, a lower pulp content, an excellent flavor, and is very highly colored. As a result, it is the easiest to process and yields a higher quality and more attractive orange base. Early and midseason orange juices are somewhat lower in quality and are used mostly for blending with the valencia orange juice.

EXAMPLE III

Carbonated bottled orange juice was prepared using a deeply colored Valencia orange base having a ratio of 21.6, a Brix of 64.83° and an apparent viscosity of 70 centipoises. The base was first thawed and filtered through rice papers to remove remaining pulp. Citric acid was added (64.4 g. in 242 ml. of solution) to 3 liters of 3954 g. of the base to adjust the ratio to 14.0 and the Brix to 62.5°. Cold-pressed peel oil (2.30 ml.) was then added to obtain an 0.015 percent level in the reconstituted juice for flavor enhancement. The fold was calculated based on a 14.0° Brix reconstituted juice as follows:

$$\frac{\text{LB/GAL } 62.5° \text{ BRIX}}{\text{LB/GAL } 14.0° \text{ BRIX}} = \frac{6.782}{} = 5.51 \text{ FOLD}$$

To obtain 14.0° Brix, one part by volume of the adjusted base must be reconstituted with 4.51 parts of carbonated water. Therefore, to each 6 fluid ounce bottle of juice (178 ml.), 32 ml. of the orange base was added.

A solution of sodium benzoate was prepared containing 8.54 grams per 48 ml. of solution and one ml. was added per bottle to obtain 1/10 of 1 percent benzoate content.

The bottles were pre-chilled to 0°C. prior to addition of the concentrate base and the sodium benzoate and for one hour afterward in order to solidify the contents to prevent gushing or foaming when filling with carbonated water. The water temperature during carbonation and filling of the bottles was 32°F. After the bottles and contents had reached approximately 40°F., they were inverted repeatedly until reconstitution was complete and then placed in 40°F. storage.

| Analysis of Bottled Product | |
|---|---|
| Corrected refract Brix | 14.20° |
| Acid | 1.01% |
| Ratio | 14.06 |
| pH | 3.5 |
| Pressure-bottled juice | 12–15 PSI |
| Pressure-bottled water | 20–23 PSI |

Flow diagrams 1 to 3 illustrate further the process steps of the instant invention.

No. 1

FLOW DIAGRAM

Preparation of ORANGE JUICE CONCENTRATE SYRUP BASE

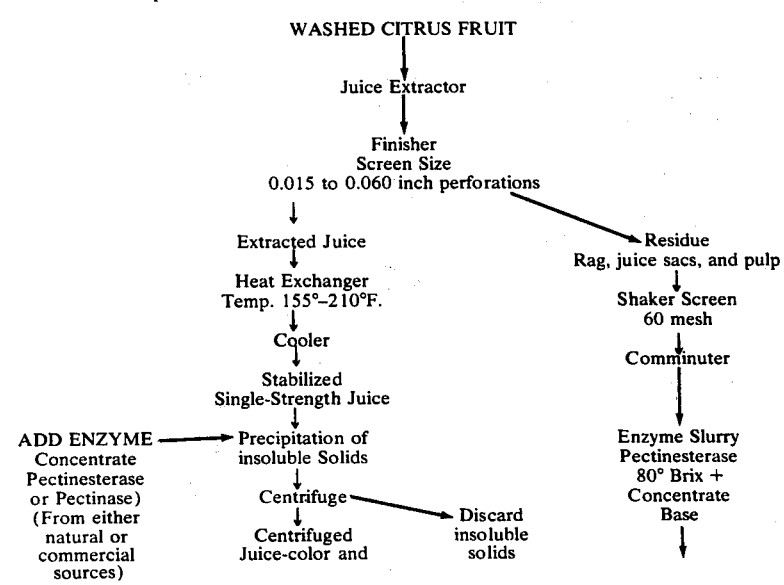

-continued

---
No. 1
---

FLOW DIAGRAM

Preparation of ORANGE JUICE CONCENTRATE SYRUP BASE

WASHED CITRUS FRUIT
↓
Juice Extractor
↓
Finisher
Screen Size
0.015 to 0.060 inch perforations
↓
cloud retained → Enzyme-Concentrate Mixture — 65° Brix Storage 0°F.
↓
Evaporator
for water removal
concentration
of soluble solids
↓
Concentrate
Desired concentration
64° Brix – 80° Brix
(64 – 80% natural sugar
and acid)
↓
Refilter through
standard type
filter
↓
ORANGE JUICE
CONCENTRATE
SYRUP BASE
for Manufacture ---
No. 2
---

FLOW DIAGRAM

Preparation of High Energy Concentrate and High Energy Canned Single-Strength Juices from Orange Juice Concentrate Syrup Base Orange Juice Concentrate Syrup Base
65° Brix – 80° Brix
↓
Refilter through
Rice filter paper
or suitable pore
filter
↓
Refiltered Syrup Base
Selected Brix — 72°
↓
Dilute with
Isotonic type salts
suspended in water
↓
65° Brix syrup with
NaCl, KCl, and $CaCl_2$
salts
↓
Reconstituted with          → High Energy
Distilled or deionized         Supplement Concentrate
water to 12° Brix
↓                    ↓                    ↓
Hot fill into        Close                Heat to
Tin or Glass         Tin or glass         165°F. to
                     Keep Frozen          175°F.
                     at 0°F.              ↓
↓                                         Hot Fill
Cool                                      in cans or glass
                                          ↓
High Energy Supplement                    Cool
Single-Strength Canned Juice              ↓
                                          Store below 45°F.

---
No. 3
---

FLOW DIAGRAM

Preparation of Carbonated Orange Juice from Orange Juice Concentrate Syrup Base

Orange Juice Concentrate Syrup Base
↓
Filtered Base
65° Brix
↓
Add Cold-Pressed Oil
and Essence Oil
for 0.012% Level
↓
Measured Amount
Sodium Benzoate
solution added
for 1/10 of 1%
Level
↓
Measure amount
filled into bottles (shot)
↓
Bottles and Contents
Chilled
↓
Bottles filled with chilled
carbonated water
(Temp. of water 32°F.)
↓
Bottles capped
↓
Carbonated Orange Juice
at single-strength Level
(10.5°Brix to 13.5°Brix)

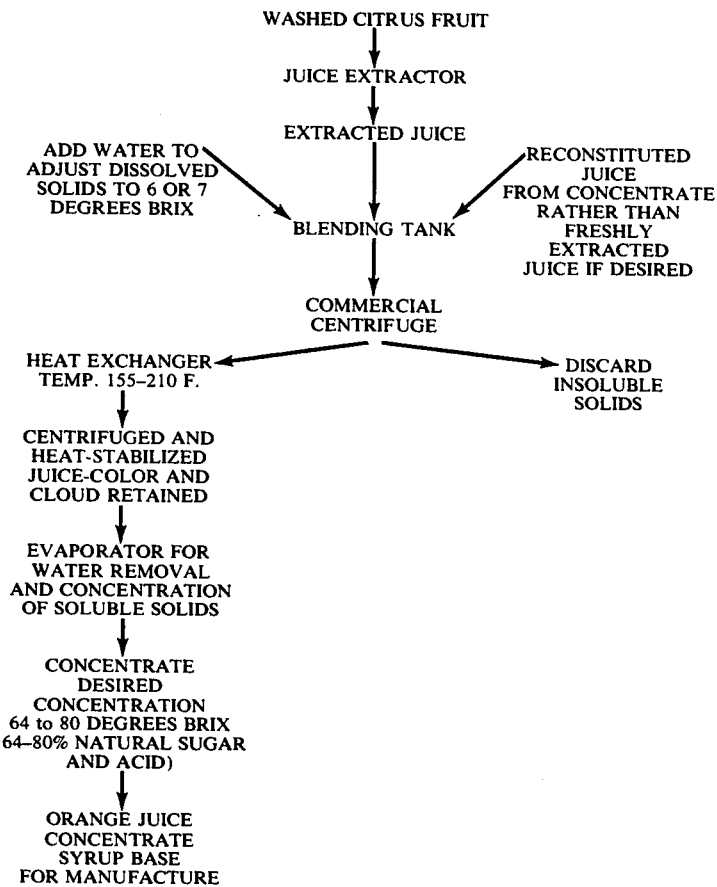

FLOW DIAGRAM

PREPARATION OF ORANGE JUICE CONCENTRATE SYRUP BASE
(ALTERNATE METHOD)

What is claimed is:

1. A process for producing a single-strength, highly colored, low viscosity orange base having the cloud, color and body of natural orange juice which comprises first diluting a single-strength orange juice with water to about 6° to 7° Brix and a viscosity of about one half of its original value, centrifuging the diluted juice to remove pulp down to a level of 0.3 to 0.6 percent by volume, other insoluble materials present down to a level of about 0.002 to 0.015 weight percent and pectins to about 0.03 to 0.05 weight percent, heat-treating the depulped juice to kill any microorganisms present, and obtaining a highly colored, single strength orange juice base with a light transmission which is not more than a value of 20 percent transmitted light over the percentage of light transmission for natural single strength orange juice.

2. The process of claim 1 wherein the described insoluble materials are removed by depulping with a high-speed desludge centrifuge.

3. The process of claim 1 wherein the diluted, depulped orange juice is heat-treated at about 200°F. and then concentrated to about 64° to 80° Brix by removal of a portion of the water present in the juice.

4. The process of claim 1 wherein the diluted, depulped orange juice is heat-treated to about 200°F. and concentrated to about 64° to 80° Brix and has a viscosity of 500 to 700 centipoises.

5. The process of claim 3 wherein the single-strength juice is concentrated in a vacuum evaporator.

* * * * *